3,819,680
NITRATION OF BENZOIC ACID ESTERS
Kinzo T. Yamashita, Essex, and David E. Graham and Eldred Welch, Union, N.J., assignors to GAF Corporation, New York, N.Y.
No Drawing. Filed May 28, 1970, Ser. No. 41,534
Int. Cl. C07c 101/54, 101/58
U.S. Cl. 260—471 R   10 Claims

ABSTRACT OF THE DISCLOSURE

Mononitro derivatives of benzoic acid, and mono- and dichloro-benzoic acid, are produced economically and in good yield by nitration of benzoic acid or chloro- or dichloro-benzoic acid esters, preferably a lower alkyl ester, with a mixture of nitric acid and sulfuric acid, or oleum containing up to the theoretical of sulfur trioxide required to combine with the water formed in nitration, at a temperature of about 10° C. to about 80° C. The thus produced mononitro esters may be hydrolyzed to the corresponding mononitro-acid.

---

This invention relates to an improved method for the preparation of mononitro derivatives of benzoic acid and mono- and dichlorobenzoic acid.

It has been the practice to produce mononitro derivatives of benzoic acid and mono- and dichlorobenzoic acid by nitration of the corresponding benzoic acid using mixed nitric and sulfuric acids as the nitrating agent. Such processes, while they are quite efficient, suffer from the disadvantage that they require large quantities of sulfuric acid.

The production of the large quantities of such products presents the problems of handling the spent acid and of neutralizing or recovering it so that the plant effluent will meet established standards.

Thus the nitration of 2,5 dichlorobenzoic acid, using a mixed acid consisting of 33% nitric acid and 67% sulfuric acid, at the optimum temperature for the reaction, requires a weight ratio of total sulfuric acid as 100% to 2,5 dichlorobenzoic acid of about 6.1–8.1:1, depending on the purity of the 2,5 dichlorobenzoic acid used. If a weight ratio lower than about 6.1:1 (11.9 moles to 1 mole) is used when a 2,5 dichlorobenzoic acid having a purity of about 95% is nitrated, or a weight ratio lower than about 8.1:1 (15.8 moles to 1 mole) when a 2,5 dichlorobenzoic acid having a purity of about 70% is so nitrated, the reaction mass becomes heavier, making agitation more difficult and less effective and resulting in a lower yield.

While as disclosed in U.S. Pat. 3,397,229 issued Aug. 13, 1968 to Eldred Welch, one of the present applicants the weight ratio of total sulfuric acid to 2,5 dichlorobenzoic acid may be reduced to about 3.33–4.1:1 by using a mixed acid consisting of 33% nitric acid and 67% sulfuric acid and oleum containing 65% free sulfur trioxide, this still requires the use of rather large quantities of sulfuric acid, which presents a problem of neutralization or recovery. In addition, in both of the above processes, solids are formed during the nitration and present an agitation problem.

We have now found that if a lower alkyl ester of benzoic acid, or mono- or dichlorobenzoic acid, instead of benzoic acid is nitrated, the problems and disadvantages of the conventional processes described above are overcome to a great extent. The spent sulfuric acid is greatly decreased. The nitration mixture is liquid and homogeneous, and the nitrated products can be handled as liquids.

In brief, the process of the present invention involves the nitration of a lower alkyl (1–4 carbon atoms) ester or benzoic acid, or a mono- or dichlorobenzoic acid, at a temperature of about 10° C. to 80° C. with mixed nitric acid and sulfuric acid.

The lower alkyl esters of benzoic acids, which may be nitrated by the process of the present invention, may be represented by the following formula:

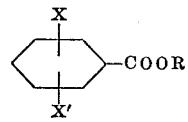

wherein X and X' each represent the same or different member of the group consisting of H, Cl or Br, and R represents an alkyl radical of 1–4 carbon atoms, e.g. methyl, ethyl, propyl, isopropyl, n-butyl, sec-butyl or t-butyl. These esters, a number of which are well known in the art, may conveniently be made by reacting the corresponding benzoic acid chloride with an alkanol of 1–4 carbon atoms. The esterification reaction may be conducted at room or ambient temperatures, although somewhat higher or lower temperatures may be employed if desired. The alcohol may be added to the acid chloride or vice versa or both can be simultaneously run into and mixed in a vessel. Hydrogen chloride is evolved and can be recovered as muriatic acid, or if desired the esterification may be conducted in the presence of a weak base, such as calcium carbonate, sodium bicarbonate etc., as an acid acceptor. Suitable alkanols are: methanol, ethanol, propanol, isopropanol, 1-butanol, 2-butanol or t-butyl alcohol. Methanol is particularly preferred, since it is the least expensive and the methyl ester is quite satisfactory. While other alcohols, such as amyl alcohol, hexyl alcohol, cyclohexyl alcohol, heptyl alcohol, benzyl alcohol etc., and the esters produced by their use, are operative and theoretically can be used, as a practical matter, except for a situation where the mononitro derivative of a specific ester of benzoic acid or a mono- or dichlorobenzoic acid is desired, the use of other than a lower alkyl ester cannot be economically justified.

The nitrating agent used in practicing the present invention is, as stated above, mixed nitric and sulfuric acids. It is advantageous to use a composition containing a relatively high quantity of nitric acid, to keep the amount of spent sulfuric acid as low as possible. Thus mixed acid containing from about 20% to 35% nitric acid are preferred. The amount of mixed acid used is that quantity which contains at least the theoretical, and preferably a slight excess, usually less than 10% excess although in some cases up to 50% excess or slightly higher, weight of nitric acid required for mononitration of the benzoic acid. The sulfuric acid used should be of at least 95% strength, but we have found it to be advantageous to use oleum containing from a few percent of free sulfur trioxide up to the amount of free sulfur trioxide theoretically required to react with the water formed in the nitration. Since both the ester which is nitrated in our process and the mononitro ester produced are liquids, we have found that it is not essential that the sulfuric acid used contain an amount of free sulfuric trioxide sufficient to react with the water which is formed, and in order to keep the amount of spent sulfuric acid low, we prefer to use a mixed acid consisting of 20–35% nitric acid with the balance being sulfuric acid containing from 20 to 40% free sulfur trioxide. Actually the optimum acid we have used had 20–23% $HNO_3$, 23–26% $SO_3$ and the remainder $H_2SO_4$. Specific mixed acids which have been employed and found to be quite satisfactory include those listed in the following table containing the weight percent of nitric acid listed in the table with the remainder being sulfuric acid containing the amount of free sulfur trioxide listed in the table.

| | Weight percent nitric acid | Percent free sulfur trioxide in sulfuric acid | Ratio of total [1] sulfuric acid to 2,5-dichlorobenzoic acid methyl ester | | | |
|---|---|---|---|---|---|---|
| | | | 100% | 70% [2] | | 88% [2] | |
| | | | | Weight | Molar | Weight | Molar |
| A | 25 | 17 | 1.47:1 | 3.11:1 | 1.17:1 | 2.45:1 |
| B | 20.5 | 24.6 | 1.93:1 | 4.04:1 | 1.54:1 | 3.22:1 |
| C | 33 | 0 | 0.94:1 | 1.97:1 | 0.75:1 | 1.57:1 |

[1] The sulfuric trioxide is expressed as sulfuric acid.
[2] Purity of 2,5-dichlorobenzoic acid methyl ester.

The process of the present invention is particularly valuable for the nitration of esters of 2,5-dichlorobenzoic acid to produce the mononitro esters of 2,5-dichlorobenzoic acid, particularly those having a high content of 2,5-dichloro-3-nitrobenzoic acid ester, which may be hydrolyzed to 2,5-dichloro-3-nitrobenzoic acid. This as disclosed in U.S. Pat. 3,013,873 is a valuable selective herbicide for the eradication of both narrow and broadleaf weeds from economically desirable crops and is sold for this use under the trade-name Dinoben. Moreover 2,5-dichloro-3-nitrobenzoic acid is a valuable intermediate for the production of 3-amino-2,5-dichlorobenzoic acid, which as disclosed in U.S. Pats. 3,014,063 and 3,174,842 is also a selective herbicide and is sold under the trade-name Amiben especially as a preemergent weedkiller in soybeans, snapbeans, tomatoes, squash and the like. The present invention will therefor be described with particular reference to its use for the nitration of esters of 2,5-dichlorobenzoic acid.

2,5-dichlorobenzoic acid is usually made by chlorination of benzoyl chloride followed by rectification to produce a crude, or technical, grade of 2,5-dichlorobenzoyl chloride consisting of a major amount of the desired 2,5-dichloro isomer, but also containing some of the 3,4-dichloro and 2,3-dichloro isomers as well as some monochlorinated material, mostly 3-chlorobenzoic acid chloride, and some trichlorinated material, mostly 2,3,5-trichlorobenzoic acid chloride, and possibly other isomers of the above. It is usually not economically attractive to endeavor to produce 2,5-dichlorobenzoic acid, or its chloride, of more than about 95% purity, or assay. On the other hand it is usually uneconomical to nitrate 2,5-dichlorobenzoic acid, or an ester thereof, with a purity much below about 70%. Therefore, we prefer to use in our nitration process an ester of 2,5-dichlorobenzoic acid having a purity of 70–95%, which may be produced by esterification of an acid chloride of similar purity.

The nitro esters formed in our nitration reaction, may be isolated by pouring the liquid reaction mass into water and letting the oily ester separate, and recovering the same. The nitro ester which is recovered can be purified by conventional methods such as distillation or fractional crystallization or it can be hydrolyzed to a salt of the acid with a base such as sodium hydroxide, or with mineral acid to the free organic acid. After the hydrolysis, the alcohol formed can be rectified and reused in the esterification reaction with the acid chloride. The free acids may be purified by conventional means. However in the case of our preferred product 2,5-dichlorobenzoic acid, and also other products which similarly lend themselves to a purification by pH fractionation, we prefer to hydrolyze the nitro ester to a salt with a base such as sodium hydroxide, and purify the product by pH fractionation without previous precipitation of the salt. Suitable pH fractionation procedures are disclosed in the art, for instance in U.S. Pats. 3,174,999, 3,417,137 and 3,441,603.

The value of the process of this invention for the production of mononitro-benzoic acid and mono- and dichlorobenzoic acids, such as 2,5-dichloro-3-nitro-benzoic acid is considerable. The quantity of spent sulfuric acid resulting from the nitration step is reduced drastically, thus decreasing the cost of the nitration as well as of the neutralization or recovery and reconstitution of the spent acid. The starting ester and the nitrated esters are liquid at low temperature, whereas the corresponding free benzoic acids and particularly the corresponding free nitrobenzoic acids are solids at the temperatures employed. Thus the esters are much easier to handle and less expensive to isolate, since all that is required is the separation of the two liquid layers resulting from the drowning of the nitrated mass. A high melting (solid) product requires a filtration, which involves more expensive equipment and more labor and time. The present process is thus more readily adapted to continuous operation than are the prior art processes.

The details of the present invention will be apparent to those skilled in the art from the following specific examples thereof.

EXAMPLES A THROUGH G

Preparation of esters

A series of esters of chlorinated benzoic acids were prepared in the following manner: Into a suitable agitated flask there was charged the amount of the particular chlorinated benzoic acid chloride shown in Table 1 below. There was then run in at a slow rate the amount (approximately 10% excess over that required for complete esterification) of the particular alcohol shown in the table, while agitating the contents of the flask and maintaining the temperature shown in the table, the hydrogen chloride formed was allowed to escape. After ester formation was complete as indicated by no odor of the pungent acid chloride, the residual hydrogen chloride and excess alcohol were removed by application of vacuum or by sparging. In each case the ester was a sweet smelling liquid which did not solidify at room temperature and was formed quantitatively.

TABLE 1

| Example number | Benzoic acid chloride used | Amount, g. | Alcohol used | | Temp., °C. |
|---|---|---|---|---|---|
| | | | Type | Amount, g. | |
| A | 2,5-dichlorobenzoic (79% assay) | 3,142 | Methanol | 504 | 40–70 |
| B | 2,5-dichlorobenzoic (88% assay) | 1,047.5 | do | 168 | 50–60 |
| C | 2,5-dichlorobenzoic (70% assay) | 1,047.5 | do | 168 | 40–70 |
| D | p-chlorobenzoic (>99% pure) | 25 | do | [1] 10 | 50–70 |
| E | 2,5-dichlorobenzoic (>99% pure) | 50 | do | [1] 20 | 50–70 |
| F | 2,5-dichlorobenzoic (88% assay) | 419 | Ethanol | 102 | 60–70 |
| G | 2,5-dichlorobenzoic (88% assay) | 419 | 1-propanol | 132 | 70–95 |

[1] Cubic centimeters.

The analyses, by vapor phase chromatography, of the acid chlorides used in Examples A, B, C, F and G above were as follows:

| Acid chloride, percent | Example | | | |
|---|---|---|---|---|
| | A | B | C | F and G |
| 3-chlorobenzoic acid | 3.0 | 1.3 | 1.8 | 1.3 |
| 2,3-dichlorobenzoic acid | 11.1 | 5.3 | 15.3 | 5.3 |
| 2,5-dichlorobenzoic acid | 79.0 | 88.2 | 69.6 | 88.2 |
| 3,4-dichlorobenzoic acid | 4.0 | 5.2 | 5.0 | 5.2 |
| 2,3,5-trichlorobenzoic acid | 2.2 | 0 | 5.3 | 0 |
| Undetermined benzoic acids | 0.7 | 0 | 3.0 | 0 |

NITRATION OF ESTERS

Example 1

A sample of the methyl ester of 2,5-dichlorobenzoic acid prepared in Example A above was nitrated in the following manner:

Into a reaction vessel fitted with an agitator there was charged 260 grams of the methyl ester of 2,5-dichlorobenzoic acid prepared in Example A above. There was then run in under agitation, over a period of 2¼ hours, 339 grams of a mixed acid containing about 25% nitric acid, 17% free sulfur trioxide and the remainder sulfuric acid, while keeping the temperature at 10–60° C. by external cooling. After all the mixed acid had been added the reaction mixture was agitated at temperature for a further period of ½ hours. The reaction mass was then poured into water and let stand and allowed to separate into an upper aqueous acid layer and a lower liquid nitro ester layer. The liquid nitrated ester layer was drawn off into a flask containing about 250 cc. water. 120 grams of 50% sodium hydroxide solution was added to the flask over a period of 3 hours while agitating at 60–70° C. and agitation continued at temperature for an additional period of about 2 hours to complete the hydrolysis of the ester, at which time the reaction mixture is homogeneous. If desired the methanol formed can be removed and rectified through a distillation column, however it is not necessary that the methanol be removed, as it can be left in without any disadvantage. The 2,5-dichloro-3-nitrobenzoic acid, which was in solution as the sodium salt, was then purified by a pH fractionation as follows:

The temperature of the solution was adjusted to about 55–65° C. While maintaining this temperature, under agitation there was dropped in over a period of one hour a total of about 30 cc. of 78% sulfuric acid until the pH dropped to 2.5–2.7. Agitation was continued for one hour on temperature adding more sulfuric acid as required to keep the pH at 2.5–2.7. The precipitated 2,5-dichloro-3-nitrobenzoic acid was recovered by filtration over a Büchner funnel, washed with about 400 cc. of warm water, until the filtrate was light in color, and the wet cake dried at about 85° C.

There was thus recovered 110 grams of 2,5-dichloro-3-nitrobenzoic acid, as a nearly white product having a melting point of 214–216° C. and an assay equivalent to commercially available "Dinoben" but with less unnitrated component. A portion of the thus produced 2,5-dichloro-3-nitrobenzoic acid was reduced to the ammonium salt of 2,5-dichloro-3-aminobenzoic acid having an assay equivalent to that of "Amiben" but with less dichlorobenzoic acid salt content. The materials and conditions used in this example are summarized in Table 2 below, while the analysis (assay) by vapor phase chromatograph of the 2,5-dichloro-3-nitrobenzoic acid recovered is given in Table 3 below.

Examples 2 through 5

Using the procedure described in Example 1 above the esters produced in Examples B, C, F and G were nitrated, and the nitrated esters obtained were hydrolyzed to and recovered as 2,5-dichloro-3-nitrobenzoic acid. The specific conditions, materials and amount used in these examples is given in Table 2 below and the analyses of the 2,5-dichloro-3-nitrobenzoic acid recovered is given in Table 3 below, along with the similar information for Example 1.

TABLE 2

| Example number | Ester nitrated | | Nitration [1] | | | Saponification | | | Precipitation,[2] °C. |
|---|---|---|---|---|---|---|---|---|---|
| | | Grams | Reaction temp., °C. | Hours of add'n | Hours held at temp. | 50% NaOH, g. | Tepp., °C. | Time, hr. | |
| 1 | Methyl from Ex. A | 260 | 10–60 | 2¼ | ½ | 120 | 60–70 | 5 | 65 |
| 2 | Methyl from Ex. B | 260 | 10–60 | 2½ | ½ | 120 | 60–70 | 5 | 55 |
| 3 | Methyl from Ex. C | 260 | 10–60 | 2½ | ½ | 120 | 60–70 | 5 | 65 |
| 4 | Ethyl from Ex. F | 219 | 12–20 | 2 | ½ | 96 | 60–70 | 5 | 55 |
| 5 | Propyl from Ex. G | 233 | 20–26 | 2 | ½ | 90 | 70–80 | 5 | 55 |

[1] Mixed acid A (containing 25% nitric acid, 17% free sulfur trioxide and the remainder sulfuric acid) was used in all examples. 339 g. thereof (6% excess HNO₃) was used in Examples 1, 2 and 3; 276 g. thereof (9% excess HNO₃) was used in Examples 4 and 5.
[2] Precipitation was effected by addition of 78% strength sulfuric acid to adjust pH to 2.5–2.7 in all examples.

TABLE 3

| Example number | Melting point, °C. | Analyses | | | Yield data | | |
|---|---|---|---|---|---|---|---|
| | | 2,5-dichlorobenzoic acid | 2,5-dichloro-6-nitrobenzoic acid | 2,5-dichloro-3-nitrobenzoic acid | 2,5-dichloro-3-nitrobenzoic acid | | |
| | | | | | Grams | Percent effective | Ratio[1] |
| 1 | 214–216 | 0.4 | 0.1 | 92.4 | 110 | 42.2 | 99.4 |
| 2 | 214–216 | 1.3 | 0.5 | 94.0 | 153 | 58.7 | 98.2 |
| 3 | 214–216 | 0.5 | 0.2 | 91.8 | 109 | 41.8 | 99.3 |
| 4 | 216–218 | 0.0 | 0.0 | 95.6 | 101 | 46.1 | 100 |
| 5 | 216–218 | 0.3 | 0.0 | 95.3 | 94 | 40.2 | 99.6 |

[1] Ratio = $\dfrac{\text{Weight of pure 2,5-dichloro-3-nitrobenzoic acid in product}}{\text{Weight of isomers of 2,5-dichloro-3-nitro-benzoic acid}}$

Example 6

The entire methyl ester of p-chlorobenzoic acid produced in Example D above was charged to a small flask equipped with a stirrer. While stirring and cooling externally, 40 g. of the nitrating agent used in Example 1 above, was added at 35–50° C. over about 1 hour. After a further ½ hour of agitating on temperature, the homogeneous liquid reaction mass was drowned into water and allowed to stand and separate into an aqueous acid layer and nitrated methyl ester layer. The liquid nitrated methyl ester layer was drawn off into a flask containing an approximately equal volume of water, and the nitrated ester was hydrolyzed by the addition of 50% aqueous sodium hydroxide. On completion of the hydrolysis, by which time the reaction mixture was homogeneous, hydrochloric acid was added to acidify the mixture and convert the nitrated p-chlorobenzoic acid, which was present as the sodium salt therein, to nitro-p-chlorobenzoic acid, which precipitated. The solid mononitro-p-chlorobenzoic acid was removed by filtration, washed with water and dried. The dried product was light yellow in color and melted at 178–180° C. It was obtained in a nearly quantitative yield.

Example 7

In the same manner as described in Example 6 above, all of the methyl ester of 2,4-dichlorobenzoic acid produced in Example E was nitrated by the addition thereto of 66 g. of the same nitrating agent, and the nitrated ester produced was hydrolyzed and recovered as nitro-2,4-dichlorobenzoic acid. The yield of dried product was 93% of theory.

Examples 8 through 14

A series of experiments were carried out in which a methyl ester of 2,5-dichlorobenzoic acid, prepared as in Example B above, from 2,5-dichlorobenzoyl chloride of 87.6% assay, was nitrated but in which the nitrating agent (mixed acid), the amount thereof and/or the temperature of the nitration reaction was varied. In each of these experiments 81.8 g. of the above methyl ester was used. These experiments were conducted using the procedure described in Example 1 above. The mixed acid was dropped into the rapidly agitated ester, while cooling to maintain the reaction temperature. The amount of mixed acid used was that necessary to furnish the percent excess nitric acid, noted in Table 4 below, over that theoretically required for mononitration of the ester, assuming a molecular weight of 205 for the methyl ester. On completion of the addition of the mixed acid, the reaction mass was held at the reaction temperature for 2 hours with agitation. The reaction mixture was then drowned into an ice/water slurry, the water decanted, and the oil was given a water wash and a sample of the thus obtained crude nitrated ester mixture, so obtained, analyzed by vapor phase chromatograph. As is crude nitrated ester mixture so obtained was then saponified by dropping in 5 cc. portions of 50% aqueous sodium hydroxide. The saponification was completed when the exotherm ceased and all was in solution. Sulfuric acid of 78% strength was then added to adjust the pH to 2.5–2.7 to convert the sodium salt of the 2,5-dichloro-3-nitrobenzoic acid to the free acid which precipitated.

The precipitated 2,5-dichloro-3-nitrobenzoic acid was recovered by filtration, water washed and dried. The purified 2,5-dichloro-3-nitrobenzoic acid, so recovered, in each case had a purity in the range of 93–98% as evidenced by its melting point given in Table 5 below.

The details of these experiments are given in Table 4 below, and the yield, expressed as percent effective (pure 2,5-dichloro-3-nitrobenzoic acid) from the initial 2,5-dichlorobenzoyl chloride, and analyses (by vapor phase chromatograph) of the crude nitrated ester mixture are given in Table 5.

We claim:

1. An improved process for the production of mononitro benzoic acid derivatives consisting essentially of:
   (a) contacting a liquid lower alkyl ester of a benzoic acid selected from the group consisting of benzoic acid, monochlorobenzoic acid and dichlorobenzoic acid with a mixed acid nitrating agent, consisting of nitric acid and sulfuric acid at a temperature of from about 10° C. to about 80° C., the amount of nitrating agent employed being sufficient to provide nitric acid in an amount within the range of from about the stoichiometric amount required for mononitration of said benzoic acid and formation of liquid mononitro ester product up to about 50% by weight excess of nitric acid for said mononitration, said mixed acid containing about 20% to about 35% nitric acid by weight with the balance sulfuric acid, the liquid lower alkyl ester of said benzoic acid being contacted with said mixed acid without preblending with concentrated sulfuric acid, said lower alkyl ester having from 1 to 4 carbon atoms in said alkyl group,
   (b) drowning the reaction mass containing said liquid mononitro ester product in water, thus forming two liquid phases, one said liquid phase consisting of said mononitro ester product, the other liquid phase consisting of an aqueous phase containing spent acid; and
   (c) separating the desired liquid mononitro ester product phase from said aqueous liquid phase, whereby the mononitro ester product is conveniently recovered in liquid form by liquid-liquid phase separation.

2. The process of claim 1 in which the sulfuric acid employed in the nitrating agent is at least about 95% strength.

3. The process of claim 1 in which the sulfuric acid employed in the nitrating agent is oleum containing free sulfur trioxide in amounts up to the amount thereof required to react with the water formed in the mononitration reaction.

4. The process of claim 3 in which said sulfuric acid employed contains from about 20% to about 40% free sulfur trioxide by weight.

5. The process of claim 4 in which the nitrating agent employed contains from about 20% to about 23% nitric acid by weight, about 23% to about 26% free sulfur trioxide by weight and the balance sulfuric acid.

TABLE 4

| Example number | Nitration | | | | Saponification | | | Precipitation, °C. |
| --- | --- | --- | --- | --- | --- | --- | --- | --- |
| | Reaction temp., °C. | Mixed acid | Excess HNO₃ percent | Time of add'n (hrs.) | Grams 50% NaOH | Temp., °C. | Time (min.) | |
| 8 | 65 | C | 10 | 1½ | 27.3 | 75–80 | 120 | 65 |
| 9 | 65 | C | 50 | 1 | 30.5 | 75–80 | 120 | 60 |
| 10 | 45–50 | C | 50 | ¾ | 71 | 60 | | 60 |
| 11 | 45–50 | A | 10 | 1 | 35 | 65–70 | | 60 |
| 12 | 30 | A | 10 | 1 | 172 | 65–70 | 12+ | 60 |
| 13 | 45–50 | B | 10 | 1 | 183 | 65–70 | 10 | 60 |
| 14 | 30–33 | B | 10 | ¾ | 48 | 65–70 | 8 | 60 |

TABLE 5

| Example number | Melting point, purified 2,5-dichloro-3-nitrobenzoic acid, °C. | Analyses (Crude nitrated ester mixture) | | | | Yield data | | |
| --- | --- | --- | --- | --- | --- | --- | --- | --- |
| | | 2,5-dichlorobenzoic acid | 2,5-dichloro-6-nitrobenzoic acid | 2,5-dichloro-3-nitrobenzoic acid | 2,5-dichloro-4-nitrobenzoic acid | 2,5-dichloro-3-nitrobenzoic acid | | |
| | | | | | | Grams | Percent effective | Ratio[1] |
| 8 | 218–219.5 | 2.30 | 40.76 | 47.75 | 1.25 | 29.3 | 35 | 0.60 |
| 9 | 216–219 | .88 | 42.89 | 40.70 | 6.38 | 36.8 | 43.9 | 0.66 |
| 10 | 218.5–221.5 | .89 | 40.77 | 42.51 | 6.62 | 34.8 | 41.5 | 0.60 |
| 11 | 218–221.5 | .84 | 37.39 | 46.84 | 6.23 | 37.9 | 45.2 | 0.74 |
| 12 | 219–222.5 | 1.16 | 33.40 | 49.01 | 6.51 | 42.1 | 52.2 | 0.86 |
| 13 | 215–218.5 | .83 | 32.75 | 47.66 | 8.43 | 43.7 | 52.1 | 0.90 |
| 14 | 218–220 | .99 | 33.76 | 48.68 | 6.92 | 45.8 | 54.7 | 0.94 |

[1] Ratio = Weight of pure 2,5-dichloro-3-nitrobenzoic acid product obtained / Weight of isomers of 2,5-dichloro-3-nitrobenzoic acid discarded in purification 6. The process of claim 4 in which the amount of nitrating agent employed is sufficient to provide an excess of not more than about 10% nitric acid by weight above the stoichiometric amount for mononitration of said lower alkyl ester.

7. The process of claim 1 in which said lower alkyl ester consisting of an ester taken from the group consisting of methyl, ethyl and propyl.

8. The process of claim 7 in which said lower alkyl ester of a benzoic acid is the methyl ester of 2,5-dichlorobenzioc acid having a purity of from about 70% to about 95%.

9. The process of claim 1 in which said lower alkyl ester of a benzoic acid is the ethyl ester of 2,5-dichlorobenzoic acid having a purity of from about 70% to about 95%.

10. The process of claim 5 in which said alkyl ester is the methyl ester of 2,5-dichlorobenzoic acid.

References Cited

UNITED STATES PATENTS 3,397,229   8/1968   Welch _____ 260—515

LORRAINE A. WEINBERGER, Primary Examiner

L. A. THAXTON, Assistant Examiner